United States Patent
Ganapathy (10) Patent No.: US 8,750,475 B1
(45) Date of Patent: Jun. 10, 2014

(54) DETERMINING COST EFFECTIVE WAYS OF COMMUNICATING

(75) Inventor: Murali Ganapathy, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 308 days.

(21) Appl. No.: 13/363,991

(22) Filed: Feb. 1, 2012

(51) Int. Cl.
*H04M 15/00* (2006.01)

(52) U.S. Cl.
USPC ............ 379/114.06; 379/114.02; 379/127.04; 379/128; 379/201.02; 379/354

(58) Field of Classification Search
CPC ..... H04M 15/00; H04M 15/06; H04M 15/50; H04M 15/1833; H04M 2201/18; H04M 2215/0108; H04M 2215/22; H04M 2215/7435; H04M 2242/06; H04M 2213/13256; H04Q 2213/13282; H04L 12/14; H04L 65/85; H04W 4/12; H04W 4/16; H04W 4/24
USPC ............... 379/114.2, 114.05, 114.09, 114.12, 379/114.15, 114.01, 118, 121.01, 121.02, 379/122, 125, 127.01, 127.04, 128, 130, 379/201.01, 201.02, 354, 114.06
See application file for complete search history.

(56) References Cited

U.S. PATENT DOCUMENTS

| | | | | |
|---|---|---|---|---|
| 5,392,342 A | * | 2/1995 | Rosenthal | 379/211.03 |
| 5,479,411 A | | 12/1995 | Klein | |
| 5,793,859 A | * | 8/1998 | Matthews | 379/211.03 |
| 6,072,867 A | * | 6/2000 | Lieuwen | 379/220.01 |
| 6,104,799 A | * | 8/2000 | Jain et al. | 379/211.01 |
| 6,263,057 B1 | | 7/2001 | Silverman | |
| 6,532,366 B1 | | 3/2003 | Chung et al. | |
| 7,076,447 B1 | | 7/2006 | Peyser et al. | |
| 7,711,102 B2 | * | 5/2010 | Worsham et al. | 379/211.03 |
| 8,036,367 B2 | | 10/2011 | Baluja et al. | |
| 8,090,091 B2 | * | 1/2012 | Ekstrom | 379/221.08 |
| 8,160,229 B2 | * | 4/2012 | Evslin | 379/220.01 |
| 8,494,134 B2 | * | 7/2013 | Clark et al. | 379/142.06 |
| 8,594,298 B2 | * | 11/2013 | Klein et al. | 379/211.02 |
| 2002/0046166 A1 | | 4/2002 | Kitchen et al. | |
| 2002/0111915 A1 | | 8/2002 | Clemens et al. | |
| 2002/0169716 A1 | | 11/2002 | Johnson et al. | |
| 2004/0246920 A1 | | 12/2004 | Savolainen | |
| 2005/0022001 A1 | | 1/2005 | Bahl et al. | |
| 2006/0056353 A1 | | 3/2006 | McBride | |
| 2006/0083171 A1 | | 4/2006 | Tanaike et al. | |
| 2007/0008926 A1 | | 1/2007 | Oba | |
| 2008/0166999 A1 | | 7/2008 | Guedalia et al. | |
| 2008/0274715 A1 | | 11/2008 | Heit et al. | |
| 2011/0116479 A1 | | 5/2011 | Jarzra et al. | |

* cited by examiner

*Primary Examiner* — Binh Tieu
(74) *Attorney, Agent, or Firm* — Leydig, Voit & Mayer, Ltd.

(57) ABSTRACT

A method may include receiving an instruction to communicate with a second computing device associated with a contact of a user of the first computing device, identifying one or more contact methods associated with communicating with the contact, identifying one or more communication capabilities associated with the second computing device, identifying unique pairs of contact methods and communication capabilities, selecting one or more unique pairs associated with a likelihood of reaching the contact via the associated contact method and, for each of the selected unique pairs, determining a cost associated with initiating communication to the identified contact method using the identified communication capability, and determining a reliability measure associated with the communication capability. The method may include identifying a recommended unique pair based on at least the cost and the reliability measure, and initiating communication with the second computing device to the identified contact method using the recommended communication capability.

20 Claims, 4 Drawing Sheets

DETERMINING COST EFFECTIVE WAYS OF COMMUNICATING

BACKGROUND

A device user, such as a mobile device user, often has several different methods of communicating with a contact available to the user. For example, a user may place a voice call, a calling card call or a video call to contact another person. A user typically would like to use a method that is likely to reach a contact and that is reliable and cost effective.

SUMMARY

This document describes methods and systems that can help a user obtain information about different telecommunications plans based on the user's location and social network.

In an embodiment, a method may include receiving, by a first computing device, an instruction to communicate with a second computing device associated with a contact of a user of the first computing device, identifying one or more contact methods associated with communicating with the contact, identifying one or more communication capabilities associated with the second computing device, identifying a plurality of unique pairs of contact methods and communication capabilities, selecting, from the plurality of unique pairs, one or more unique pairs associated with a likelihood of reaching the contact via the associated contact method and, for each of the selected unique pairs, determining a cost associated with initiating communication to the identified contact method using the identified communication capability, and determining a reliability measure associated with the communication capability. The method may include identifying a recommended unique pair based on at least the cost and the reliability measure, and initiating, by the first computing device, communication with the second computing device to the identified contact method using the recommended communication capability.

In an embodiment, a method may include receiving, by a first computing device, an instruction to communicate with a second computing device associated with a contact of a user of the first computing device, identifying one or more contact methods associated with communicating with the contact, identifying one or more communication capabilities associated with the second computing device, identifying a plurality of unique pairs of contact methods and communication capabilities, selecting, from the plurality of unique pairs, one or more unique pairs associated with a likelihood of reaching the contact via the associated contact method, and for each of the selected unique pairs, determining a cost associated with initiating communication to the identified contact method using the identified communication capability. In an embodiment, the method may include identifying a recommended unique pair from the selected unique pairs based on at least the associated cost, and initiating communication with the second computing device to the identified contact method using the recommended communication capability.

In an embodiment, a method comprising may include receiving, by a first computing device, an instruction to communicate with a contact of a user of a second computing device. The instruction may be received from the second computing device. The method may include identifying one or more contact methods associated with communicating with the contact, identifying one or more communication capabilities associated with the second computing device, identifying a plurality of unique pairs of contact methods and communication capabilities, selecting, from the plurality of unique pairs, one or more unique pairs associated with a likelihood of reaching the contact via the associated contact method, and for each of the selected unique pairs, determining a cost associated with initiating communication to the identified contact method using the identified communication capability, and determining a reliability measure associated with the communication capability. The method may include identifying a recommended unique pair based on at least the cost and the reliability measure, and transmitting the recommended unique pair to the second computing device.

In an embodiment, a system may include a computing device and a computer-readable storage medium in communication with the computing device. The computer-readable storage medium may include one or more programming instructions that, when executed, cause the computing device to receive an instruction to communicate with a second computing device associated with a contact of a user of the first computing device, identify one or more contact methods associated with communicating with the contact, identify one or more communication capabilities associated with the second computing device, identify a plurality of unique pairs of contact methods and communication capabilities, select, from the plurality of unique pairs, one or more unique pairs associated with a likelihood of reaching the contact via the associated contact method, and, for each of the selected unique pairs, determine a cost associated with initiating communication to the identified contact method using the identified communication capability, and determine a reliability measure associated with the communication capability. The computer-readable storage medium may include one or more programming instructions that, when executed, cause the computing device to identify a recommended unique pair based on at least the cost and the reliability measure, and initiate communication with the second computing device to the identified contact method using the recommended communication capability.

In an embodiment, a system may include a first computing device and a second computing device in communication with the first computing device. The second computing device may include a processor and a computer-readable storage medium. The computer-readable storage medium may include one or more programming instructions that, when executed, cause the second computing device to receive an instruction to communicate with a contact of a user of the first computing device, wherein the instruction is received from the first computing device, identify one or more contact methods associated with communicating with the contact, identify one or more communication capabilities associated with the second computing device, identify a plurality of unique pairs of contact methods and communication capabilities, select, from the plurality of unique pairs, one or more unique pairs associated with a likelihood of reaching the contact via the associated contact method, and, for each of the selected unique pairs, determine a cost associated with initiating communication to the identified contact method using the identified communication capability, and determine a reliability measure associated with the communication capability. The computer-readable storage medium may include one or more programming instructions that, when executed, cause the second computing device to identify a recommended unique pair based on at least the cost and the reliability measure, and transmit the recommended unique pair to the first computing device.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For situations in which the discussed systems collect personal information about users, the users may be provided with an opportunity to opt in or opt out of features or programs that may collect personal information. Such features or programs may include, without limitation, those that obtain information about a user's preferences, a user's location, and a user's social network. A user may be informed of the accompanying limitations of the functionality of a service that may result from limiting access to such personal information. Certain data may be anonymized before it is stored or used so that personally identifiable information is removed. For example, a user's geographic location may be generalized where location is obtained (such as to a city, zip code or a state), so that a particular location of a user cannot be determined. As another example, a user's identity may be anonymized so that no personally identifiable information can be determined for the user. Moreover, a user may have the ability to control what personal information and how much personal information is shared with a feature or a program.

Figure 1:
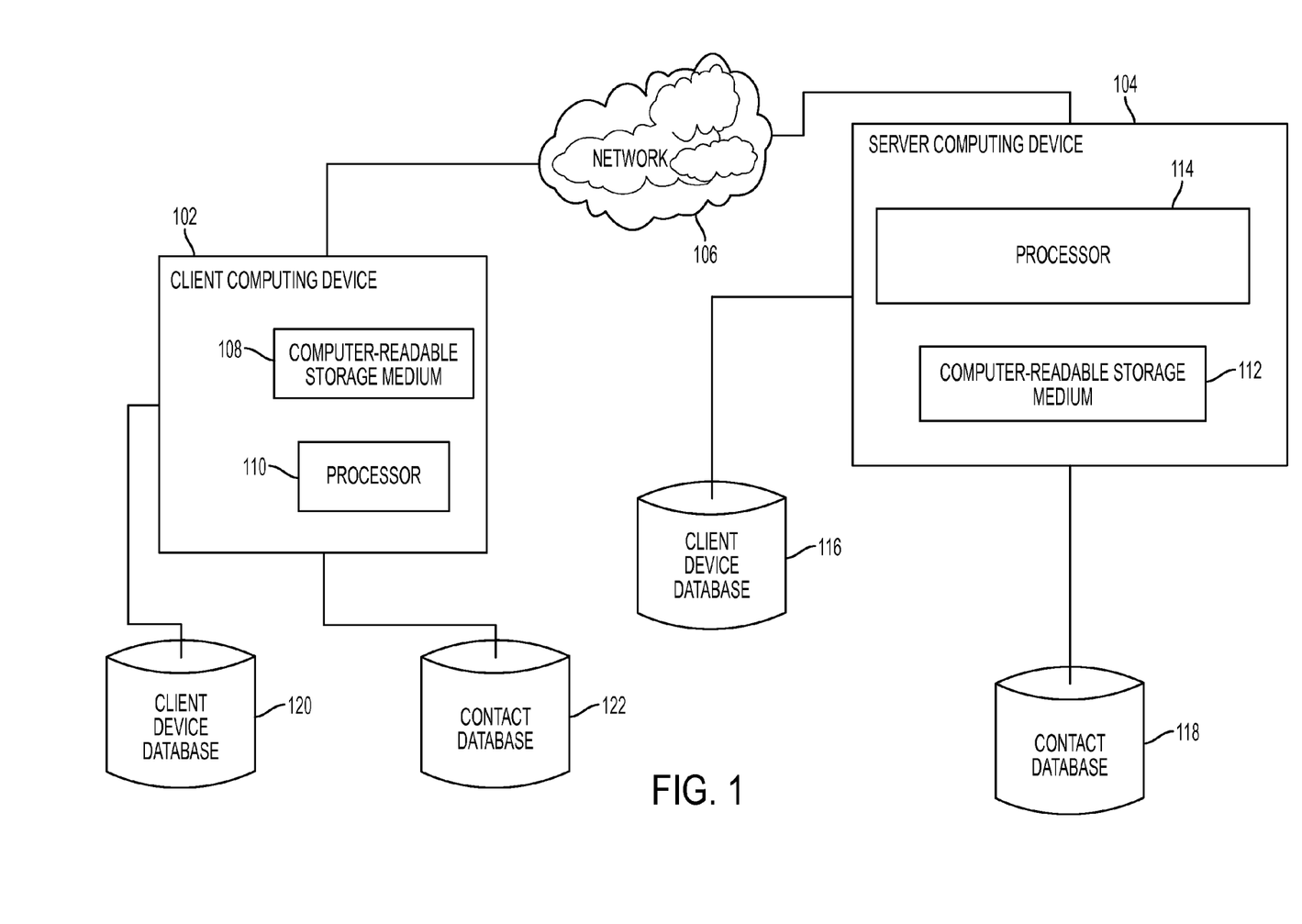
FIG. 1 illustrates a system of determining a way to reach a contact according to an embodiment.

FIG. 1 illustrates a system 100 of determining a way to reach a contact according to an embodiment. A contact may be a person who may receive a communication via a computing device from a user of another computing device.

The system includes a client computing device 102 in communication with a server computing device 104 over a network 106. In an embodiment, a network 106 may be the Internet. In an alternate embodiment, other networks, such as an intranet, WAN or LAN may be used. In addition, methods described in this disclosure may be performed by a single computing device. A computing device may be an electronic device having a processor and a memory that performs one or more operations according to one or more programming instructions.

The client computing device 102 may include a computer-readable storage medium 108 in communication with a processor 110. A computer-readable storage medium may be an electronic, optical, magnetic, or other storage or transmission device capable of providing a processor, such as the processor 110 shown in FIG. 1 with computer-readable instructions. Examples of computer-readable storage media include without limitation RAM, ROM, CD-ROM, DVD, a memory chip and the like. A processor may execute computer-executable program instructions that are stored in a computer-readable storage medium.

In an embodiment, a client computing device 102 may include one or more internal or external devices such as a mouse, a CD-ROM, DVD, a keyboard, a display, or other input or output devices. Examples of client computing devices 102 include, without limitation, personal computers, personal digital assistants, cellular phones, mobile phones, smart phones, tablets, laptop computers, and other processor-based devices. A client computing device 102 may operate on any operating system capable of supporting a browser or browser-enabled application.

In an embodiment, a client computing device may 102 be in communication with a client device database 120. A client device database 120 may store information pertaining to one or more communication capabilities available to one or more client devices. Table 1 illustrates examples of entries from an illustrative client device database 120 for a particular client computing device 102 according to an embodiment.

TABLE 1

| Client Computing Device | Provider | Time of Day | Contact Constraints | Cost | Connectivity Constraints | Reliability |
| --- | --- | --- | --- | --- | --- | --- |
| A | Cellular Telephone Service Provider 1 | Weekends | U.S. numbers | Free | None | 0.91 |
| A | Cellular Telephone Service Provider 1 | All days | All numbers | Free | In network | 0.91 |
| A | Cellular Telephone Service Provider 1 | Weekdays between 8 am-8 pm | U.S. numbers | $0.03/minute | Out of network | 0.91 |
| A | Cellular Telephone Service Provider 1 | Weekdays between 8 pm-8 am | U.S. numbers | $0.01/minute | Out of network | 0.91 |
| A | Cellular Telephone Service Provider 1 | All days | Non-U.S. numbers | $0.05/minute | None | 0.91 |

TABLE 1-continued

| Client Computing Device | Provider | Time of Day | Contact Constraints | Cost | Connectivity Constraints | Reliability |
|---|---|---|---|---|---|---|
| A | Cellular Telephone Provider 2 | All days | All numbers | Free | None | 0.84 |
| A | Calling Card A | All days | Indian numbers | $0.03/minute + $1.00 connecting charge | None | 0.84 |
| A | Chat Provider 1 | All days | Any Chat Provider 1 user | Free | WiFi, 3 G, 4 G | 0.40 |
| A | Chat Provider 1 | All days | Non-Chat Provider 1 users | $0.02/minute | WiFi, 3 G, 4 G | 0.40 |
| A | VoIP/SIP Provider 2 | All days | U.S. numbers | Free | WiFi, 3 G, 4 G | 0.55 |
| A | VoIP/SIP Provider 2 | All days | Non-U.S. numbers | $0.03/minute | WiFi, 3 G, 4 G | 0.55 |

As illustrated by Table 1, a client device database 116 may include information pertaining to communication capabilities available via a client computing device 102. A communication capability may be a communication method or service that is used by a computing device to initiate communication with a contact. Examples of communication capabilities may include cellular telephone service, chat functionality, a calling card and/or the like. For example, as shown in Table 1, Client Computing Device A may be able to use cellular telephone service provided by Provider 1 or Provider 2, Calling Card A or chat service provided by Chat Provider 1 to communicate with a contact. Each communication capability may be associated with a cost, and one or more constraints associated with the cost. For example, as illustrated in Table 1, calls placed using cellular service provided by Provider 1 on weekends to all U.S. numbers are free. However, calls placed using cellular service provider by Provider 1 on weekdays between 8 am and 8 pm to U.S. numbers associated with a provider other than Provider 1 are $0.03/minute. Additional and/or alternate communication capabilities, costs and constraints may be used within the scope of this disclosure.

In an embodiment, a communication capability may be associated with a reliability measure as illustrated in Table 1. A reliability measure may indicate a consistency associated with the communication capability. A reliability measure may be provided by a user of a client computing device. For example, if a user experiences static, dropped calls or other connection issues with the user's cellular phone service, the user may associate the service with a low reliability measure. In an embodiment, a reliability measure may be designated by a letter, a number or other indicator. For example, as illustrated in Table 1, a measure of reliability may be a number between 0 and 1, with '0' indicating poor reliability and '1' indicating strong reliability. Additional and/or alternate reliability measures may be used within the scope of this disclosure.

A reliability measure may be based on, at least in part, a probability that the features needed to produce a communication capability work satisfactorily. A feature of a communication capability may be one or more technical components needed or recommended to perform a communication capability. For instance, examples of features associated with placing a video call may include a measure of a WiFi, 3G or 4G connection, a measure of the video call quality and a measure of the strength of a data connection. As another example, features associated with making a voice call may include a signal strength associated with the computing device placing the voice call, a measure of the quality of a service provider's network and a connection quality associated with the computing device to which the voice call is placed.

In an embodiment, one or more features may have an associated score. The score may represent a quality measure associated with a feature. For example, a score associated with a data connection may represent the quality or strength of the data connection. A score may be designated by a letter, a number or other indicator. For example, a score may be a number between 0 and 1, with '0' indicating poor quality or strength and '1' indicating strong quality or strength. Additional and/or alternate scores may be used within the scope of this disclosure. In an embodiment, one or more scores may be provided by a user of a client computing device.

In an embodiment, a score associated with a connection quality of a person to be contacted may be estimated. Connection quality may be estimated based on the area where the person is expected to be. For example, for a voice call, an area may be a that associated with the person's area code. As another example, an area may be that associated with a person's home, work or other address. In an embodiment, a client computing device associated with a person to be contacted may send signal strength or other measures of connection quality to a server, such as, for example, the server computing device 104, which may aggregate the measurements to estimate a connection quality for the contact.

A reliability measure associated with a communication capability may be represented by the product of one or more associated features. For example, referring to Table 2, the reliability measure associated with a video call based on the features and corresponding scores illustrated in Table 2 may be equal to 0.51 (i.e., 0.80*0.82*0.78).

TABLE 2

| Feature | Score |
|---|---|
| WiFi/3 G/4 G connection | 0.80 |
| Call quality | 0.82 |
| Connection quality of person to be contacted | 0.78 |

In an embodiment, information pertaining to one or more communication capabilities may be provided by a user of a client computing device 102. In an embodiment, a user may enter information using the user's client computing device 102. The entered information may be stored in the client device database 120. In an embodiment, a user may enter information pertaining to one or more communication capabilities via a web browser, either via the user's client computing device 102 or another computing device, such as a laptop computer, a tablet, a desktop computer and/or the like. The entered information may be transmitted to a server computing device 104, and stored in a client device database 116 associated with the server computing device. The server computing device 104 may transmit the entered information to the corresponding client device 102. For example, the server computing device 104 may transmit the entered information to the client computing device 102 when the server computing device and the client computing device synchronize.

In an embodiment, a client computing device may 102 be in communication with a contact database 122. A contact database 122 may store information pertaining to one or more methods of communicating with one or more contacts by a client computing device 102.

Table 3 illustrates examples of entries from an illustrative client device database 122 for a particular client computing device 102 according to an embodiment. As illustrated by Table 3, a contact database 122 may include a name of a contact associated with a client computing device 102, a method of communicating with the contact, an availability associated with the method of communication, a provider associated with the method of communication, a type associated with the method of communication and/or the like. A contact method may be a way of communicating with a contact. Examples of contact methods may include a work landline, a personal mobile device, a home landline, a work mobile device and/or the like.

TABLE 3

| Client Computing Device | Contact Name | Provider | Contact Type | Contact Method | Availability |
| --- | --- | --- | --- | --- | --- |
| A | Cathy | Provider 1 | Home - Landline | 212-222-1111 | Weekdays between 5 pm and 9 pm Weekends between 9 am and 9 pm |
|  |  | Provider 1 | Work - Landline | 212-123-4567 | Weekdays between 9 am- 5 pm |
|  |  | Provider 2 | Cell Phone | 646-111-1234 | Any day between 9 am- 9 pm |
|  |  | Chat Provider 2 | Chat | CathySmith | Anytime |
| A | Mark | Provider 1 | Cell Phone | +91 2221234123 | Anytime |
|  |  | Chat Provider 1 | Chat | Mark123 | Anytime |

In an embodiment, at least a portion of the information for a contact may be provided by a user of the associated client computing device 102. For example, a user may add her sister, Kristen, to her the contact list of her mobile device. The user may specify that Kristen is reachable via a home phone number and a mobile phone number. The user may indicate the service providers associated with both contact methods and may indicate Kristen's availability at both contact methods. For example, Kristen may have small children and may prefer not to be contacted after 8 pm on her home phone.

In an embodiment, information pertaining to one or more contact methods may be provided by a user of a client computing device 102. In an embodiment, a user may enter information using the user's client computing device 102. The entered information may be stored in the contact database 122. In an embodiment, a user may enter information pertaining to one or more contact methods via a web browser, either via the user's client computing device 102 or another computing device, such as a laptop computer, a tablet, a desktop computer and/or the like. The entered information may be transmitted to a server computing device 104, and stored in a contact database 118 associated with the server computing device. The server computing device 104 may transmit the entered information to the corresponding client device 102. For example, the server computing device 104 may transmit the entered information to the client computing device 102 when the server computing device and the client computing device synchronize.

As illustrated in Table 3, Client Computing Device A may be associated with two contacts, Cathy and Mark. Cathy may be reachable via a landline at home, a landline at work or a cellular telephone. As shown in Table 3, Cathy may be reachable at home on weekdays between 5 pm and 9 pm and weekends between 9 am and 9 pm. Cathy may also be reachable at work on weekdays between 9 am and 5 pm and on his or her cellular phone any day between 9 am and 9 pm. Similarly, Mark may be reachable anytime via a cellular telephone or anytime via chat using a unique identifier "Mark123."

Although a client device database 116 and a contact database 118 are illustrated in FIG. 1 as two databases, it is understood that a single database may be used within the scope of this disclosure. Similarly, although a client device database 120 and a contact database 122 are illustrated in FIG. 1 as two databases, it is understood that a single database may be used within the scope of this disclosure.

In an embodiment, a server computing device 104 may include a processor 114 coupled to a computer-readable storage medium 112. Examples of server computing devices 104 include, without limitation, servers, mainframe computers, networked computers, a processor-based device and similar types of systems and devices. In an embodiment, a server computing device 104 may be in communication with a client device database 116 and/or a contact database 118. In an embodiment, the client device database 116 may store at least a portion of information from a client device database 120 associated with one or more client devices 102. In an embodiment, a contact database 118 may store at least a portion of information from a contact device database associated with one or more client devices 102. For example, a server computing device 104 may store copies of a user's contact list according to an embodiment. A client computing device 102 and a server computing device 104 may periodically synch in order to update information. Although a server computing device 104 is illustrated in FIG. 1 as a single computer system, it is understood that a server computing device may be implemented as a network of computing processors.

Figure 2:
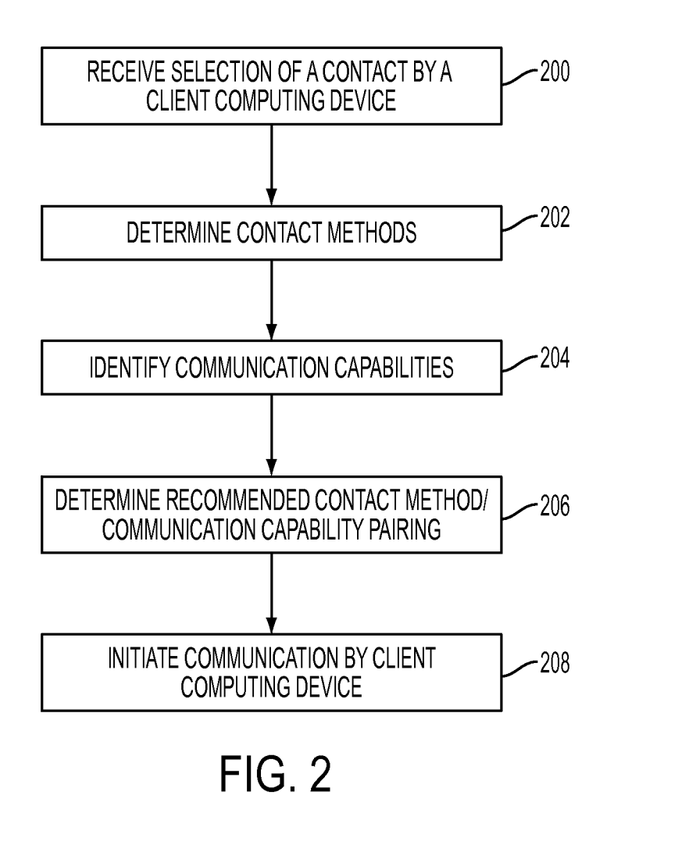
FIG. 2 illustrates a method of communicating with a contact via a client computing device according to an embodiment.

FIG. 2 illustrates a method of communicating with a contact via a client computing device according to an embodiment. In an embodiment, a selection of a contact with whom a user desires to communicate may be received 200 by a client computing device. For example, a user may select a contact from a contact list associated with the client computing device, and this selection may be received by the client computing device. Alternatively, a user may provide one or more speech commands to a client computing device instructing the client computing device to communicate with a particular contact. The speech commands may be received 200 by the client computing device. In an embodiment, a user may enter a contact's name, phone number or other information. By way of example, a user of Client Communication Device A from Tables 1 and 2 above may select Cathy from a contact list in order to initiate a conversation with Cathy. As another example, a user of Client Communication Device A may enter Cathy's telephone number into Client Communication Device A to initiate communication with Cathy.

In an embodiment, a client computing device may determine 202 one or more contact methods associated with the selected contact. In an embodiment, the client computing device may search a contact database to determine 202 one or more contact methods associated with a selected contact. A contact method may be a means of communication by which a contact is reachable. For example, a contact method may be a home telephone number, a cellular telephone number, a voice over Internet protocol/Session Initiation Protocol (VoIP/SIP) identifier, such as a handle or other unique name, and/or the like. In an embodiment, a contact may be associated with more than one contact methods. For example, a client computing device may identify Cathy from the contact request, and may search a contact database for contact methods associated with Cathy. The server computing device may determine 202 that Cathy may be reached at home, at work or on her cellular telephone as illustrated in Table 3.

In an embodiment, a client computing device may identify 204 one or more available communication capabilities associated with a client computing device. A communication capability may be a means of communication by which a communication request may be initiated by a client computing device. In an embodiment, communication capabilities associated with a mobile phone may include cellular telephone service, VoIP/SIP service, a calling card, and/or the like. For example, the communication capabilities associated with Client Communication Device A, as illustrated in Table 1, includes cellular telephone service, a calling card and chat service.

In an embodiment, a communication capability may be associated with one or more different service providers. For example, a client computing device such as a mobile phone may have multiple Subscriber Identity Module (SIM) cards that associated with two or more providers. By way of example, a mobile phone may have two SIM cards, one associated with Service Provider 1 and one associated with Service Provider 2. For instance, as illustrated by Table 1, Client Computing Device A may have a SIM card associated with Service Provider 1 and a SIM card associated with Service Provider 2. A client computing device may determine which SIM card, and therefore which service provider to use, based on, at least in part, a service provider associated with a contact. Although both correspond to cellular telephone service, each may be considered a separate communication capability.

In an embodiment, a client computing device may determine 206 a recommended contact method and communication capability pairing. A client computing device may determine 206 a recommended pairing based on a cost associated with initiating communication to a contact method via a communication capability, an availability of a contact via the contact method at the time the contact request is received, a reliability of communication capability or a combination of any or all of these factors.

In an embodiment, a client computing device may determine a current time associated with a contact method. A current time associated with a contact may be determined by identifying a location associated with the contact from the contact database. For example, a contact database may store a location associated with one or more contacts and contact methods. The client computing device may determine the current time at the corresponding location.

In an alternate embodiment, a client computing device may determine a current time associated with a contact method based on the contact method. For example, if the contact method includes a telephone number, the server device may determine a location, and a current time in the location, based on the area code of the telephone number.

In an embodiment, a client computing device may analyze the contact database to determine one or more contact methods by which the user is likely to reach a contact at the current time. For example, referring to Tables 1 and 2, a user of Client Computing Device A may wish to place a call to Cathy at noon on a weekday. Client Computing Device A may analyze its contact database and determine that the three possible contact methods that may be used to reach Cathy at that time are her work landline, her cellular telephone or via chat. As illustrated in Table 3, Cathy also may be reached via a home landline. However, the contact database indicates that Cathy is only available at this number between 5 pm and 9 pm on weekdays.

In an embodiment, a client computing device may analyze the client device database to determine which pairing of communication capability and identified contact method should be recommended to a user. In an embodiment, the recommended communication capability and contact method may be a pairing that minimizes cost but maximizes reliability.

A client computing device may determine a cost associated with a contact method. The client computing device may determine a cost by comparing one or more constraints of a communication capability to one or more constraints of a contact method. Referring back to the above example, a client computing device may compare one or more constraints associated with calling Cathy on her work landline to one or more communication capability constraints illustrated in Table 1. The client computing device may determine that because Provider 1 provides the user's cellular service and Cathy's work landline service, there is no cost associated with calling Cathy on her work landline via cellular service. Table 4 illustrates costs associated with calling Cathy via the three identified contact methods for each communication capability.

TABLE 4

| Option | Communication Capability | Contact Method | Cost | Reliability Measure |
|--------|--------------------------|----------------|------|---------------------|
| 1 | Cellular service (Provider 1) | Work landline | Free | 0.91 |
| 2 | Cellular service (Provider 1) | Cellular phone | $0.03/minute | 0.91 |
| 3 | Cellular service (Provider 1) | Chat | N/A | N/A |
| 4 | Cellular service (Provider 2) | Work landline | Free | 0.84 |
| 5 | Cellular service (Provider 2) | Cellular phone | Free | 0.84 |
| 6 | Cellular service (Provider 2) | Chat | N/A | N/A |
| 7 | Calling card | Work landline | N/A | N/A |
| 8 | Calling card | Cellular phone | N/A | N/A |
| 9 | Calling card | Chat | N/A | N/A |
| 10 | Chat | Work landline | N/A | N/A |
| 11 | Chat | Cellular phone | N/A | N/A |
| 12 | Chat | Chat | Free | 0.40 |
| 13 | VoIP | Work landline | Free | 0.55 |
| 14 | VoIP | Cellular phone | Free | 0.55 |
| 15 | VoIP | Chat | N/A | N/A |

As illustrated by Table 4, there are six communication capability/contact method pairings that are free to a user. Specifically, a user may use his or her cellular service (Provider 1) to call Cathy's work landline telephone (Option 1), the user may use his or her cellular service provider (Provider 2) to call Cathy's work landline telephone (Option 4) or Cathy's cellular phone (Option 5), the user may contact Cathy using chat capability (Option 12), the user may use VoIP/SIP to contact Cathy's work landline (Option 13), or the user may use VoIP/SIP to contact Cathy's cellular phone (Option 14).

In an embodiment, a client computing device may compare reliability measures associated with possible communication capabilities in determining a recommended communication capability and contact method. Table 4 illustrates reliability measures associated with each communication capability. Although Options 1, 4, 5, 12, 13 and 14 are free, Option 1 is associated with a higher reliability measure than Options 4, 5, 12, 13 and 14. As such, Option 1 may be selected as the recommended communication capability and contact method.

In an embodiment, cost and/or a reliability measure may be weighted. For example, if cost is more important to a user than the reliability of the communication capability, cost may be weighted more heavily than a reliability measure. Alternatively, if reliability is more important to a user than the cost, a reliability measure may be weighted more heavily than a cost. In an embodiment, both cost and reliability may be weighted equally. In an embodiment, a communication capability and contact method pairing may be associated with a score representative of a weighted cost and/or reliability. The score may be designated by a letter, a number or other indicator. For example, a score may be a number between 0 and 1, with '0' indicating high cost and/or poor reliability and '1' indicating low cost and/or strong reliability. Additional and/or alternate scores may be used within the scope of this disclosure. In an embodiment, the communication capability and contact method pairing associated with the highest score may be selected.

In an embodiment, the client computing device may initiate 208 communication with the selected contact via the recommended communication capability and contact method. In an embodiment, the client computing device may automatically initiate 208 communication with the selected contact via the recommended communication capability and contact method. For instance, referring to the above example, Client Computing Device A may automatically initiate a cellular telephone call to Cathy's work landline.

In an embodiment, a client computing device may present the recommended communication capability and contact method to a user of the client device. The client computing device may require user approval of the recommended communication capability and contact method before communication is initiated 208.

Figure 3:
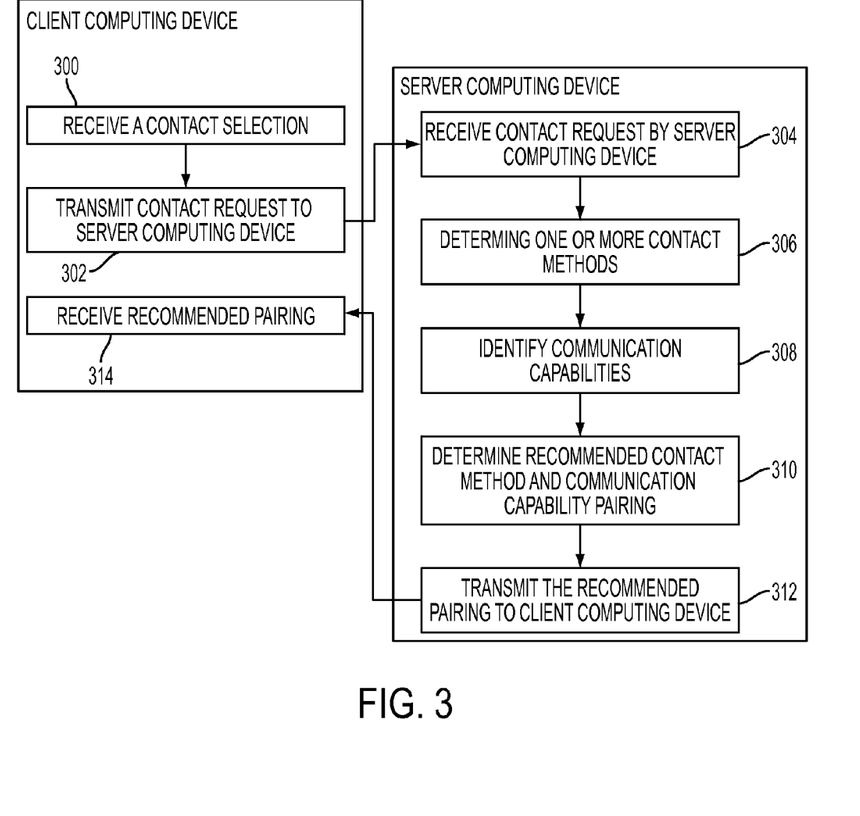
FIG. 3 illustrates a method of communicating with a contact using a client computing device and a server computing device according to an embodiment.

In an embodiment, determining a recommended communication capability and contact method may be performed, at least in part, by a server computing device. FIG. 3 illustrates a method of communicating with a contact via a client computing device and a server computing device according to an embodiment.

As illustrated by FIG. 3, a client computing device may receive 300 a selection of a contact with whom a user desires to communicate. In an embodiment, the client computing device may transmit 302 a contact request to a server computing device. A contact request may include an indication of the selected contact that with whom a user desires to communicate. For example, if a user selects Cathy from Table 3 above, a contact request transmitted 302 from Client Communication Device A to a server computing device may include an indication that Cathy is the selected contact.

In an embodiment, the server computing device may receive 304 a contact request from a client computing device, and may determine 306 one or more contact methods associated with the selected contact. In an embodiment, a server computing device may determine 306 one or more contact methods associated with a selected contact in a similar manner as described above using the contact database associated with the server computing device.

In an embodiment, a server computing device may identify 308 one or more available communication capabilities associated with a client computing device. In an embodiment, a server computing device may identify 308 one or more available communication capabilities associated with a client computing device in a similar manner as described above using the client device database associated with the server computing device.

In an embodiment, a server computing device may determine 310 a recommended contact method and communication capability pairing. In an embodiment, a server computing device may determine 310 a recommended contact method and communication capability pairing in a similar manner as described above.

In an embodiment, a server computing device may transmit 312 the recommended communication capability and contact method to a client computing device. The client computing device may receive 314 the recommended communication capability and contact method, and may initiate 316 a communication to the contact in a similar manner as described above.

Figure 4:
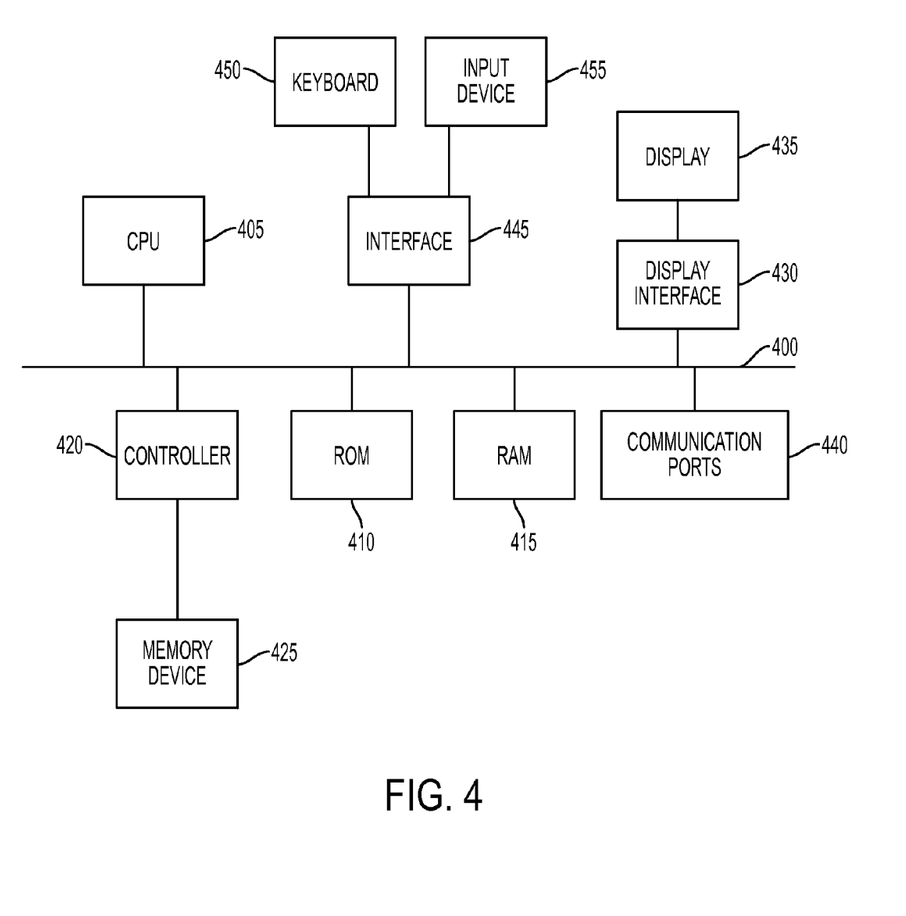
FIG. 4 illustrates a block diagram of hardware that may be used to contain or implement program instructions according to an embodiment.

FIG. 4 depicts a block diagram of hardware that may be used to contain or implement program instructions according to an embodiment. A bus 400 serves as the main information pathway interconnecting the other illustrated components of the hardware. CPU 405 is the central processing unit of the system, performing calculations and logic operations required to execute a program. Read only memory (ROM) 410 and random access memory (RAM) 415 constitute example memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions may be stored in the ROM 410 and/or the RAM 415. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 430 may permit information from the bus 400 to be displayed on the display 435 in audio, visual, graphic or alphanumeric format. Communication with external devices may occur using various communication ports 440. A communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A method comprising:
    receiving, by a first computing device, an instruction to communicate with a second computing device associated with a contact of a user of the first computing device;
    identifying one or more contact methods associated with communicating with the contact;
    identifying one or more communication capabilities associated with the second computing device;
    identifying a plurality of unique pairs of contact methods and communication capabilities;
    selecting, from the plurality of unique pairs, one or more unique pairs associated with a likelihood of reaching the contact via the associated contact method;
    for each of the selected unique pairs:
        determining a cost associated with initiating communication to the identified contact method using the identified communication capability, and
        determining a reliability measure associated with the communication capability;
    identifying a recommended unique pair based on at least the cost and the reliability measure; and
    initiating, by the first computing device, communication with the second computing device to the identified contact method using the recommended communication capability.

2. The method of claim 1, wherein determining a cost comprises:
    identifying a first service provider associated with the contact method;
    identifying a second service provider associated with the communication capability;
    determining a current time associated with the communication capability; and
    determining a cost associated with initiating communication to the identified contact method using the identified communication capability based on the service provider and the current time.

3. The method of claim 1, wherein identifying a recommended unique pairs comprises:
    selecting, from the selected unique pairs, the unique pair associated with a lowest cost and a highest reliability measure as the recommended unique pair.

4. The method of claim 1, wherein selecting one or more unique pairs associated with a likelihood of reaching the contact via the associated contact method comprises:
    determining a current time at a location associated with the contact via the contact method;
    determining whether there is a likelihood of reaching the contact via the contact method at the current time; and
    selecting the unique pair if there is a likelihood of reaching the contact via the contact method at the current time.

5. The method of claim 4, wherein determining whether there is a likelihood of reaching the contact comprises:
    determining whether the location is a work location of the contact; and
    determining whether the current time is within working hours.

6. The method of claim 4, wherein determining whether there is a likelihood of reaching the contact comprises:
    identifying a range of times the contact is available to be reached, wherein the range of times is provided by a user; and
    determining whether the current time is within the identified range of times.

7. The method of claim 1, wherein initiating communication comprises automatically initiating communication with the second computing device to the identified contact method using the recommended communication capability.

8. The method of claim 1, wherein initiating communication with the second computing device to the identified contact method using the recommended communication capability comprises:
    displaying the recommended communication capability and recommended contact method to the user; and
    receiving confirmation from the user to proceed with initiating communication via the recommended communication capability and recommended contact method.

9. A method comprising:
    receiving, by a first computing device, an instruction to communicate with a second computing device associated with a contact of a user of the first computing device;
    identifying one or more contact methods associated with communicating with the contact;
    identifying one or more communication capabilities associated with the second computing device;
    identifying a plurality of unique pairs of contact methods and communication capabilities;
    selecting, from the plurality of unique pairs, one or more unique pairs associated with a likelihood of reaching the contact via the associated contact method;
    for each of the selected unique pairs, determining a cost associated with initiating communication to the identified contact method using the identified communication capability;
    identifying a recommended unique pair from the selected unique pairs based on at least the associated cost; and
    initiating communication with the second computing device to the identified contact method using the recommended communication capability.

10. The method of claim 9, wherein determining a cost comprises:
    identifying a first service provider associated with the contact method;
    identifying a second service provider associated with the communication capability;
    determining a current time associated with the communication capability; and
    determining a cost associated with initiating communication to the identified contact method using the identified communication capability based on the service provider and the current time.

11. The method of claim 9, wherein identifying a recommended unique pairs comprises:
    selecting, from the selected unique pairs, the unique pair associated with a lowest cost.

12. The method of claim 9, wherein selecting one or more unique pairs associated with a likelihood of reaching the contact via the associated contact method comprises:
    determining a current time at a location associated with the contact via the contact method;
    determining whether there is a likelihood of reaching the contact via the contact method at the current time; and
    selecting the unique pair if there is a likelihood of reaching the contact via the contact method at the current time.

13. The method of claim 12, wherein determining whether there is a likelihood of reaching the contact comprises:

identifying a range of times the contact is available to be reached, wherein the range of times is provided by a user; and determining whether the current time is within the identified range of times.

14. The method of claim 12, wherein initiating communication comprises automatically initiating communication with the second computing device to the identified contact method using the recommended communication capability.

15. The method of claim 9, wherein initiating communication with the second computing device to the identified contact method using the recommended communication capability comprises:

displaying the recommended communication capability and recommended contact method to the user; and receiving confirmation from the user to proceed with initiating communication via the recommended communication capability and recommended contact method.

16. A system comprising:

a computing device; and a computer-readable storage medium in communication with the computing device, the computer-readable storage medium comprising one or more programming instructions that, when executed, cause the computing device to:

receive an instruction to communicate with a second computing device associated with a contact of a user of the first computing device, identify one or more contact methods associated with communicating with the contact, identify one or more communication capabilities associated with the second computing device, identify a plurality of unique pairs of contact methods and communication capabilities, select, from the plurality of unique pairs, one or more unique pairs associated with a likelihood of reaching the contact via the associated contact method, for each of the selected unique pairs:

determine a cost associated with initiating communication to the identified contact method using the identified communication capability, and determine a reliability measure associated with the communication capability, identify a recommended unique pair based on at least the cost and the reliability measure, and initiate communication with the second computing device to the identified contact method using the recommended communication capability.

17. The system of claim 16, wherein the one or more programming instructions that, when executed, cause the computing device to determine a cost comprise one or more programming instructions that, when executed, cause the computing device to:

identify a first service provider associated with the contact method;

identify a second service provider associated with the communication capability;

determine a current time associated with the communication capability; and determine a cost associated with initiating communication to the identified contact method using the identified communication capability based on the service provider and the current time.

18. The system of claim 16, wherein the one or more programming instructions that, when executed, cause the computing device to identify a recommended unique pair comprise one or more programming instructions that, when executed cause the computing device to select, from the selected unique pairs, the unique pair associated with a lowest cost and a highest reliability measure as the recommended unique pair.

19. The system of claim 16, wherein the one or more programming instructions that, when executed cause the computing device to select one or more unique pairs associated with a likelihood of reaching the contact via the associated contact method comprise one or more programming instructions that, when executed, cause the computing device to:

determine a current time at a location associated with the contact via the contact method;

determine whether there is a likelihood of reaching the contact via the contact method at the current time; and select the unique pair if there is a likelihood of reaching the contact via the contact method at the current time.

20. The system of claim 19, wherein the one or more programming instructions that, when executed cause the computing device to determine whether there is a likelihood of reaching the contact comprise one or more programming instructions that, when executed cause the computing device to:

identify a range of times the contact is available to be reached, wherein the range of times is provided by a user; and determine whether the current time is within the identified range of times.

* * * * *